Fig. 2

No. 806,667. PATENTED DEC. 5, 1905.
E. M. HEWLETT.
SYSTEM OF ELECTRIC GENERATION AND DISTRIBUTION.
APPLICATION FILED OCT. 5, 1901.

Witnesses:
Marcus L. Byng.
Helen Orford.

Edward M. Hewlett, Inventor:
by Albert G. Davis
Att'y.

Fig. 7.

No. 806,667. PATENTED DEC. 5, 1905.
E. M. HEWLETT.
SYSTEM OF ELECTRIC GENERATION AND DISTRIBUTION.
APPLICATION FILED OCT. 5, 1901.

Witnesses:

Inventor.
Edward M. Hewlett.
by
Atty.

UNITED STATES PATENT OFFICE.

EDWARD M. HEWLETT, OF SCHENECTADY, NEW YORK, ASSIGNOR TO GENERAL ELECTRIC COMPANY, A CORPORATION OF NEW YORK.

SYSTEM OF ELECTRIC GENERATION AND DISTRIBUTION.

No. 806,667.     Specification of Letters Patent.     Patented Dec. 5, 1905.

Application filed October 5, 1901. Serial No. 77,654.

*To all whom it may concern:*

Be it known that I, EDWARD M. HEWLETT, a citizen of the United States, residing at Schenectady, county of Schenectady, State of New York, have invented certain new and useful Improvements in Systems of Electric Generation and Distribution, of which the following is a specification.

In the generation and distribution of electric current for modern uses the tendency is more and more to develop the energy at the power-station in large units, and it has become a problem of the utmost importance to safely concentrate within a single power-station apparatus for generating, handling, and distributing currents of enormous volume and commonly of very high voltage. For example, in a station now existing there is concentrated within a single building apparatus for continuously generating fifty thousand horse-power at a potential of sixty-six hundred volts and capable for a short time of generating many times as much. The small space available for properly controlling this enormous volume of energy renders it imperative that every precaution be adopted to prevent damage to one part or unit of apparatus from disabling the entire station and interfering with a very extensive public service.

My invention involves an arrangement of generating, switching, and distributing apparatus by which a concentrated plant of such a type may be safely managed, though some of the features of the invention are useful in switchboards of the ordinary type.

In carrying out the invention I provide a number of independent units comprising prime movers and electric generators, each connecting by a plurality of main switches with a system of highly-insulated bus-bars, the apparatus for the control of the generating outfit and the switches being located at a common operating-point, in convenient relation to which are instruments for indicating the effectiveness of control. The distributing bus-bars connect with what is termed a "group-switch," each of which accommodates a plurality of distributing circuits or feeders, in each of which is interposed an independent switch for cutting in and out the feeder. At a board similar to the generator-operating board I provide an operating-board for the group and feeder switches with suitable means for effecting the distant control, thus removing the operator from the neighborhood of the switching mechanism to a point of safety and permitting him to recognize at that point the behavior of each critical element of the system and in case of emergency to cut off any part which is not acting properly. My invention also provides for rendering dead various portions of the distributing portion of the plant. I effect this by employing sectional bus-bars and connecting-switches by which any unit of the generating outfit may be thrown upon any feeder, while the bus-bar section normally devoted to such feeder may be disconnected and rendered dead for purposes of repairs. Thus it will be seen that the ordinary method of mounting switching mechanism upon a switchboard at which the operator stands to modify the distributing conditions is not employed. Such an organization with potentials of five to ten thousand volts and any very large amount of energy would be utterly impractical with a switchboard of feasible dimensions. In lieu of this is substituted an operating-board by which the generating and switching mechanism is controlled, and the latter instead of being mounted upon a board or panels of a board is arranged on floors or galleries of the distributing-station or in any convenient location, each part being entirely insulated from any other part and being surrounded by a fire-proof inclosure to assure the safety of the main part of the plant in case of accident to any integral unit.

The main features of novelty embrace the isolation of the several parts and the means of a thorough control of the same from a common operating-point.

The several features of novelty will be hereinafter more particularly pointed out.

In the accompanying drawings, showing a system embodying my improvements.

6 is a front elevation of the operating-board shown in Fig. 4.

Figure 1:
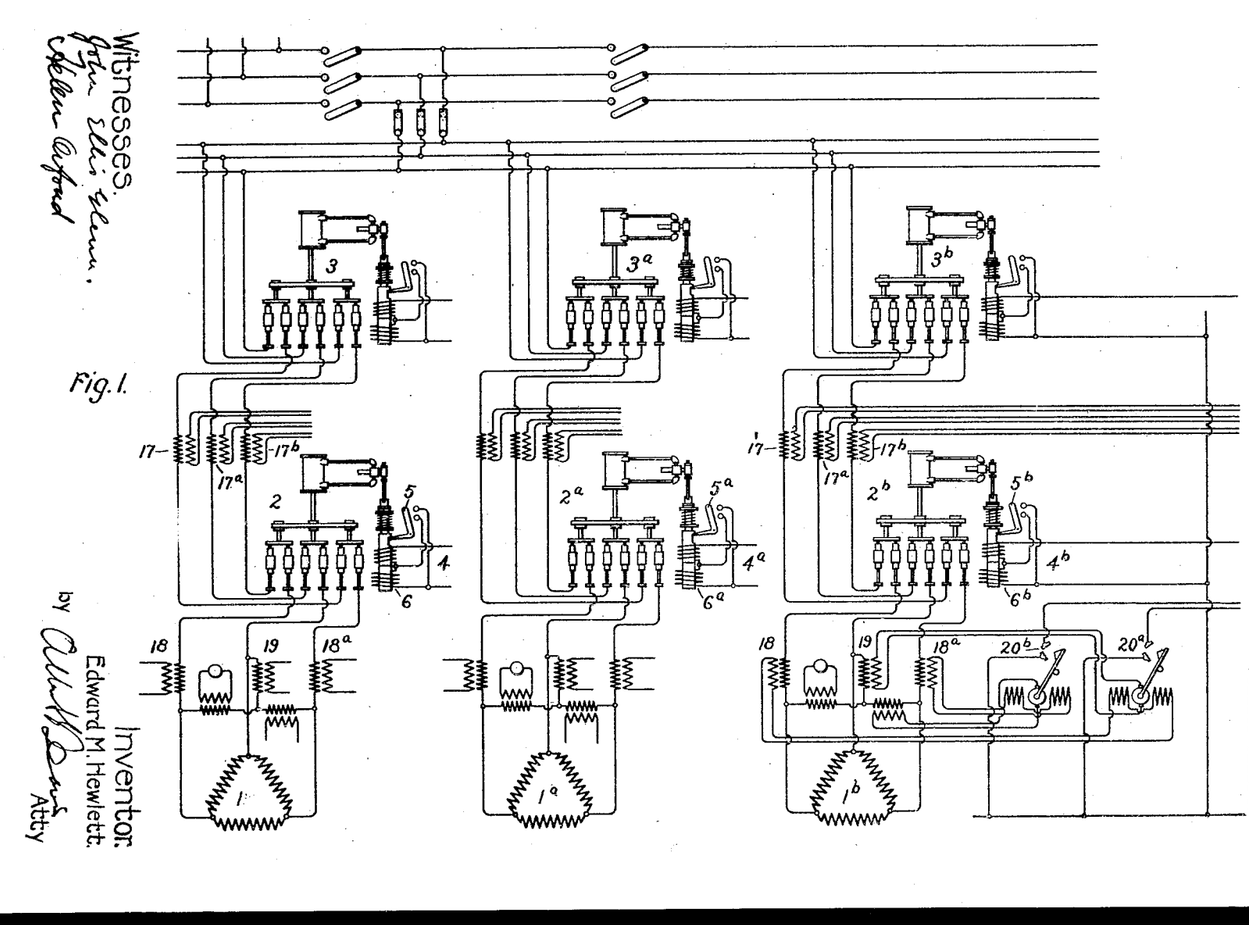
Figure 1 is a diagrammatic illustration of the generator and main switch units of a system embodying my improvements.
Figure 2:
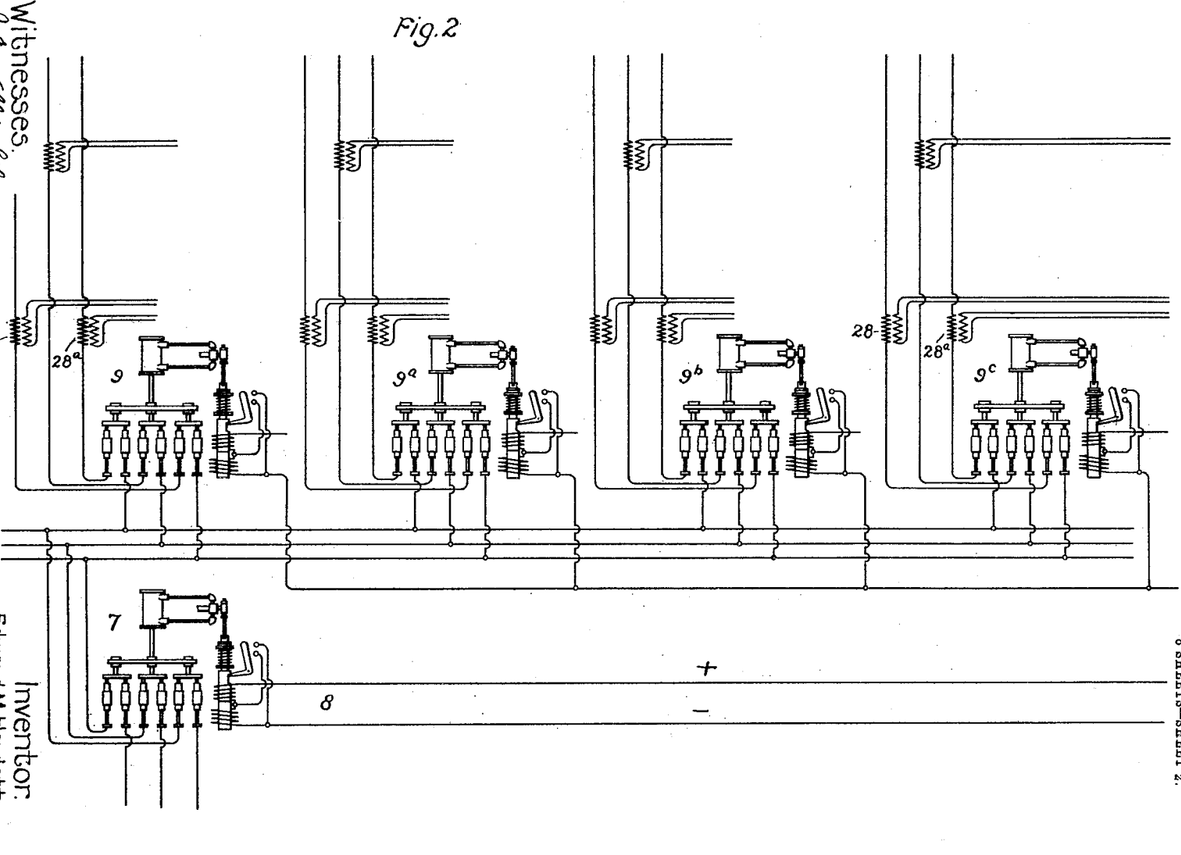
Fig. 2 is a similar illustration of one portion of the distributing side of such a station, showing a single group-switch supplying a plurality of feeder-switches.
Figure 3:
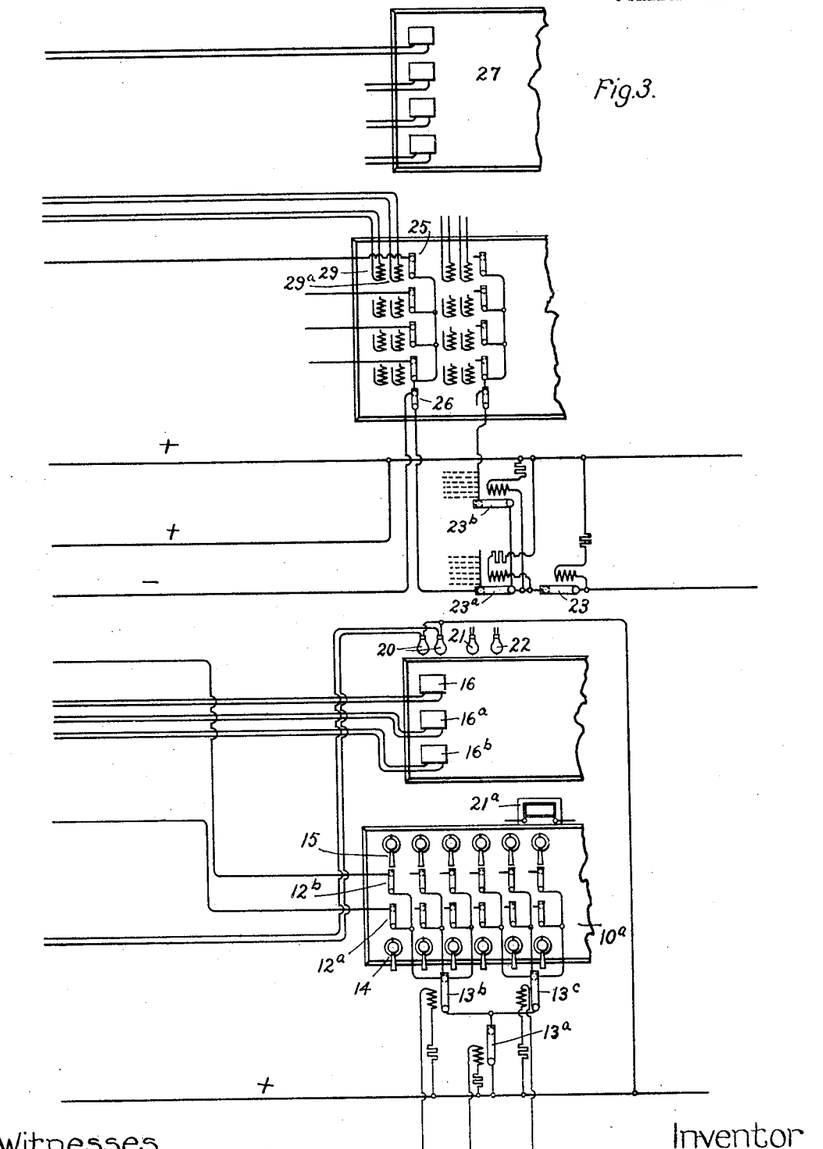
Fig. 3 is a diagram of the operating-boards for the feeders and generating units of the system shown in Figs. 1 and 2.
Figure 4:
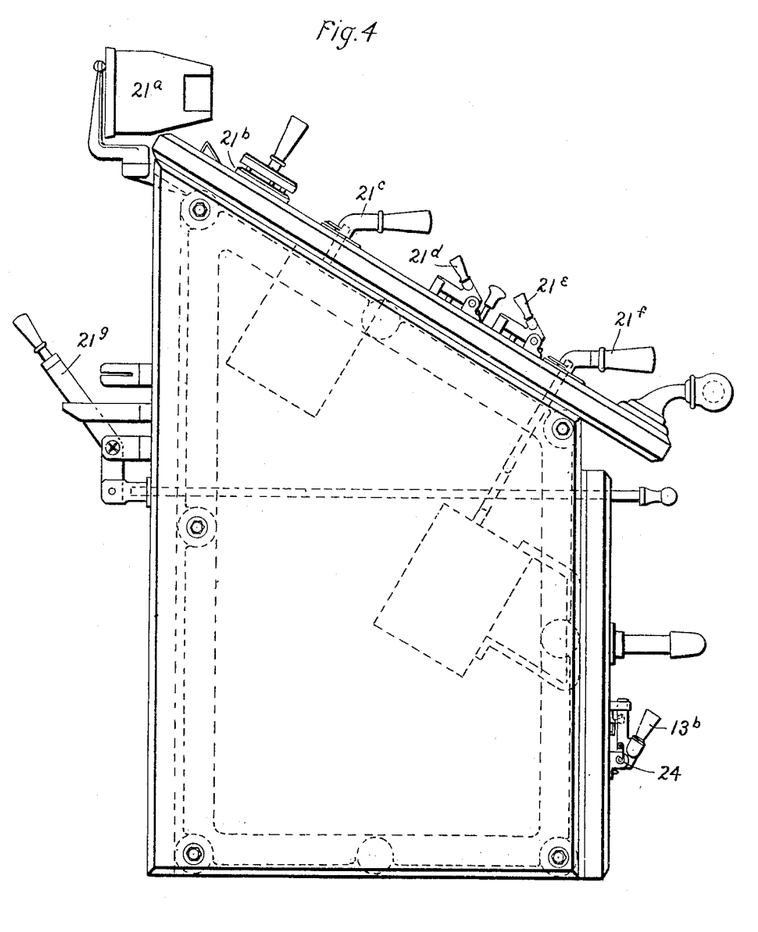
Fig. 4 is a side elevation of an operating-board for the feeder-switches.
Figure 5:
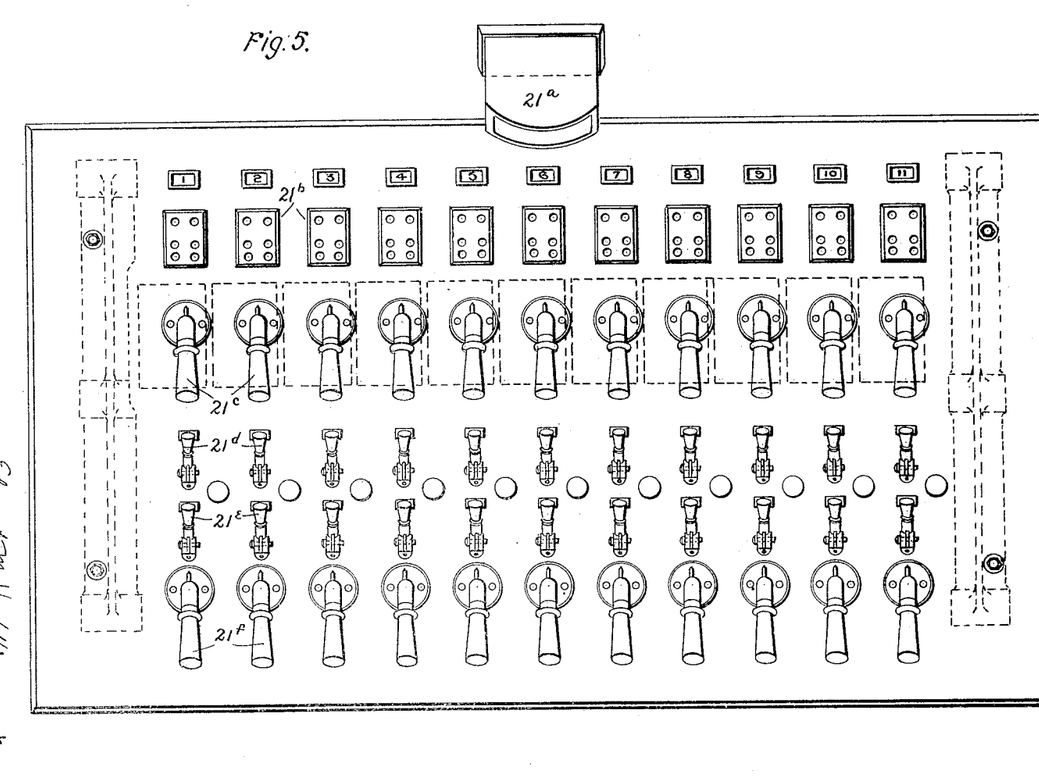
Fig. 5 is a face view of the top operating-board. Fig.
Figure 6:
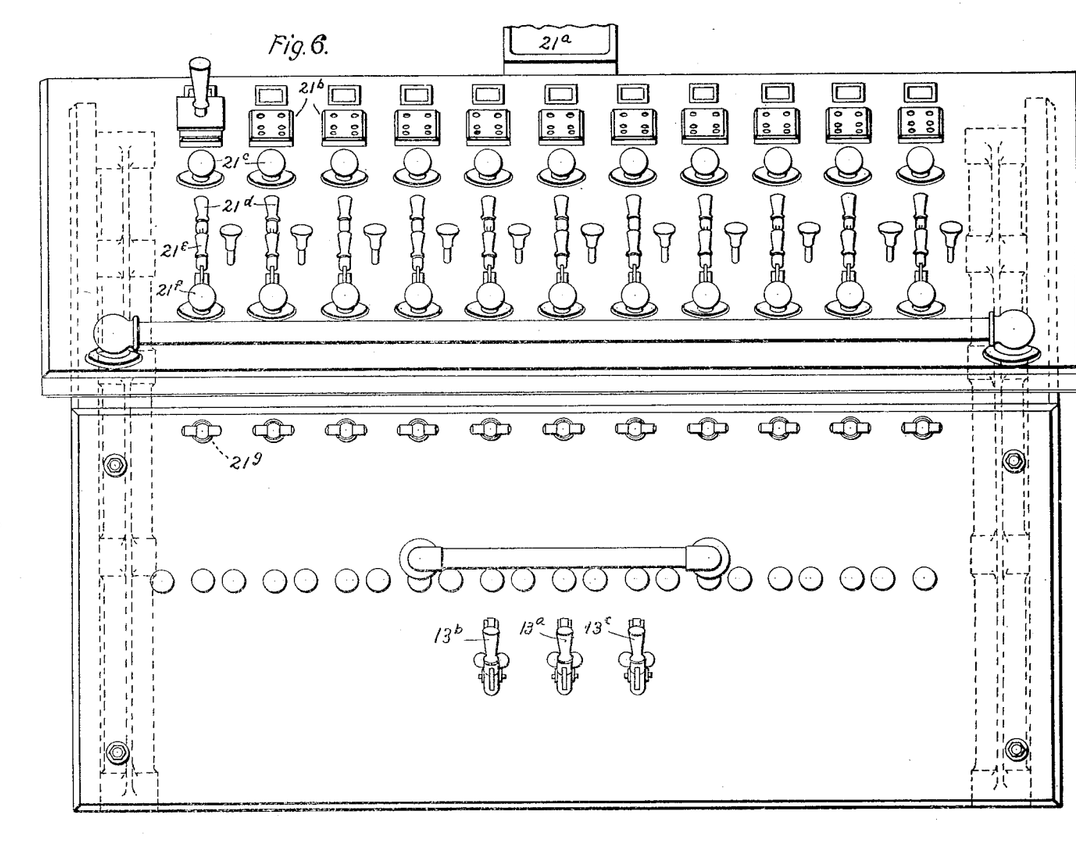
Figure 8:
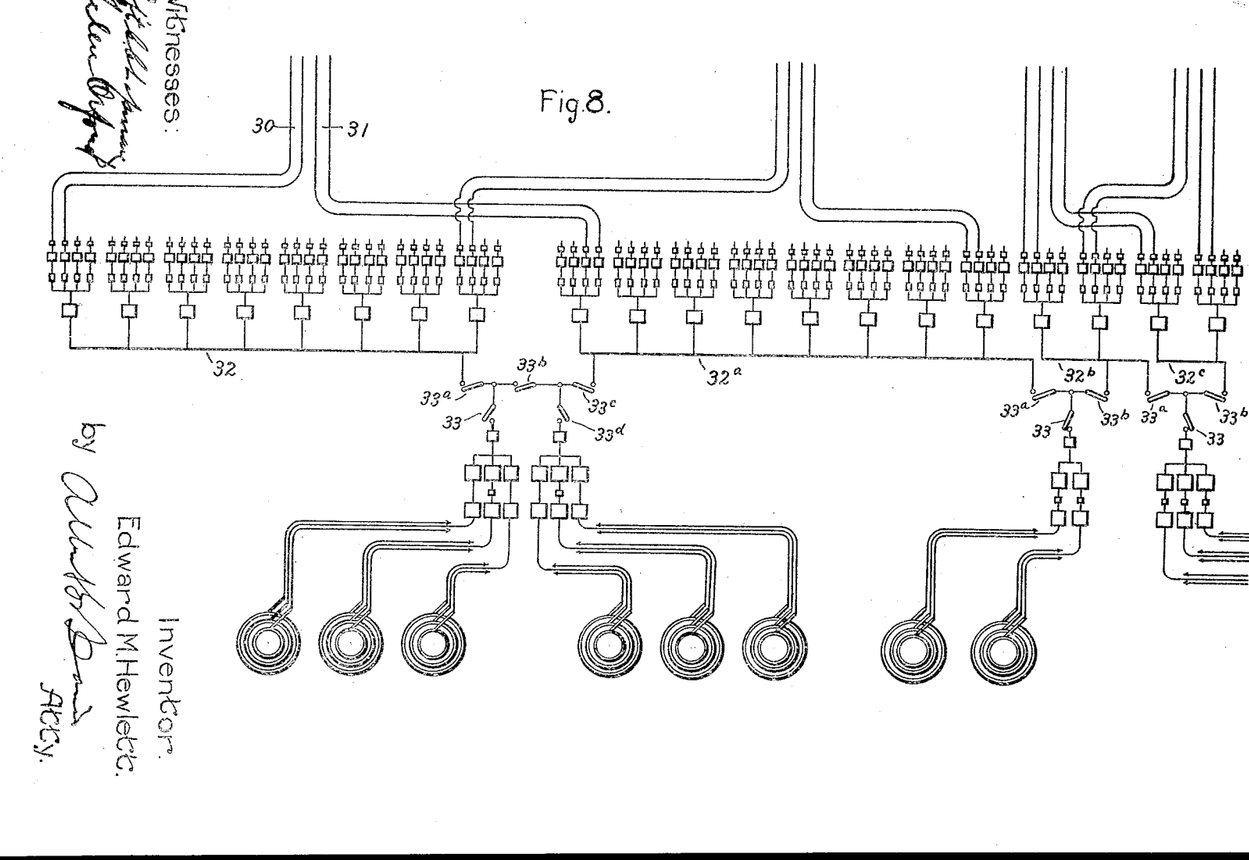
Fig. 8 is a diagrammatic illustration showing the sectional bus-bar arrangement and its relation to the generators and feeders.

In the system exemplified in Figs. 1, 2, and 3 a group of three generating units only is shown, Fig. 8 illustrating a condition actually carried out in practice in a large generating-station employing eleven independent generating units of over four thousand horsepower each arranged in four sections similarly to Figs. 1, 2, and 3. The operating-board shown in Figs. 4, 5, and 6 represents a system employing eleven generating units. A diagrammatic illustration, however, of such a system would only obscure the drawing when depicted with the same degree of detail as shown in Figs. 1, 2, and 3. These latter drawings have therefore been confined to the illustration of a small number of generating units.

1, $1^a$, and $1^b$ in Fig. 1 represent conventionally alternating-current generators, a three-phase system being selected by way of example.

Figure 7:
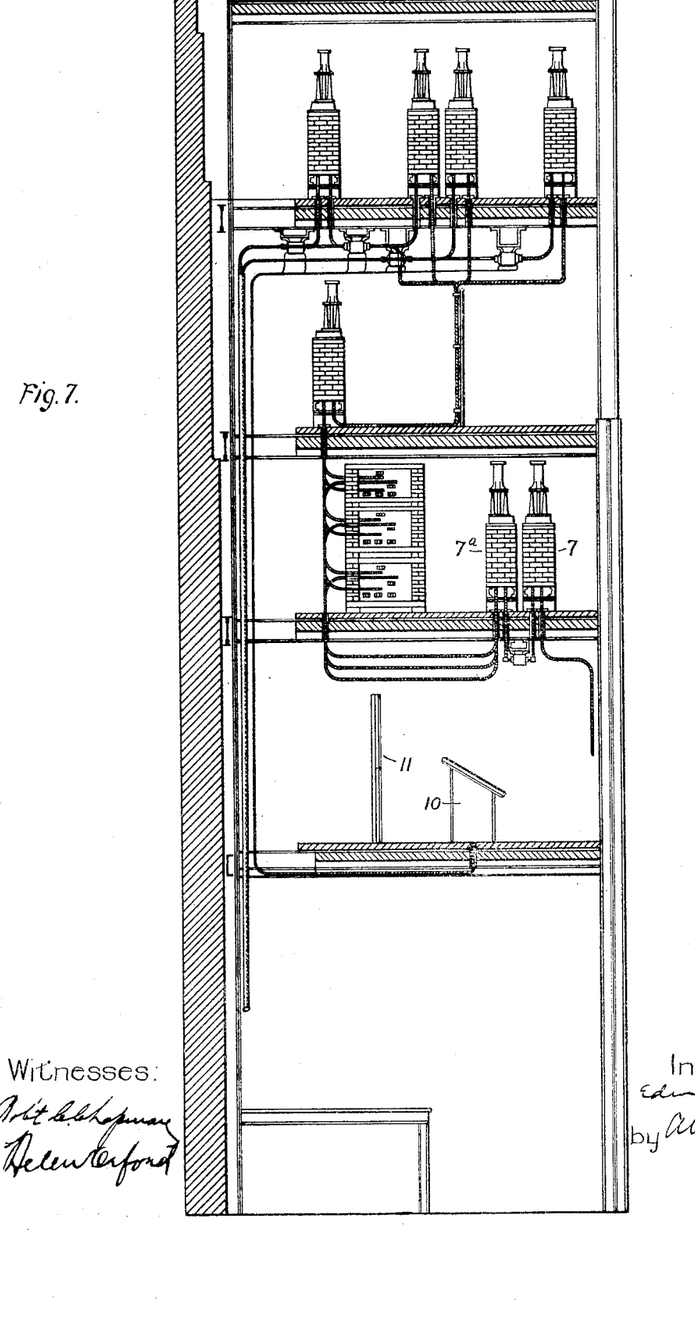
Fig. 7 is a sectional view showing the arrangement of the generator and feeder switches on separate galleries of the power-station.

2 $2^a$ $2^b$ represent main switches for connecting the generator units with the bus-bars. These switches are of a type described in an application for patent filed by me on or about February 7, 1900, Serial No. 4,314. They are of the oil type, each phase of the polyphase current being provided with an independent double-pole break and separately insulated in fire-proof cells from the other phases. These switches are electrically connected by control-circuits with the operating-board hereinafter to be described. Between each generator unit and the bus-bar two such switches are interposed, a similar group being represented at 3 $3^a$ $3^b$. The active agency in operating the switches, which may be any suitable source of power, is governed by a magnet connected in the control-circuit 4 $4^a$ $4^b$, manipulated at the operating-board. The type of switch shown is operated by compressed air, the valve of which is shifted by the magnet just referred to. It is so organized that when the control-circuit is closed at the operating-board, connecting the low-voltage-control circuit with the operating-switch magnet, the latter cuts in the switch-operating power, as by shifting the air-valve depicted in the drawings, and thus closes the switch. In doing so the magnet shifts a switch-arm 5 $5^a$ $5^b$ so as to open a shunt around a high-resistance coil 6 $6^a$ $6^b$ of the switch-magnet, thereby cutting this coil into the low-voltage-control circuit and economizing consumption of energy and at the same time insuring that the switch shall open and disconnect the circuits supplied through the switch in case of any accident to the control apparatus. This is a feature of great practical importance in that it insures the continuous maintenance of an operating condition of the control system. The two sets of switches between the bus-bars and the generator units permit a test of the condition of the switch before the generator is actually thrown upon the bus-bars, since each switch may be closed and opened in turn without connecting the generator with the bus-bars. The bus-bars connect with a plurality of group-switches, only one of which is indicated at 7 in Fig. 2. As they are all of the same type, however, this will be sufficient for purposes of explanation. This is a switch of the same type as that already described, but may be of different capacity and is operated by a control-circuit 8, leading to the feeder-operating board. Means for controlling it automatically or by hand are provided. In series relation to each group-switch 7 are individual feeder-switches 9 $9^a$ $9^b$ $9^c$, four of which connected in parallel are shown for each group-switch, and these open and close on the bus-bars connected with the group-switch the separate feeder-circuits which lead from the station. At a convenient point in the station are grouped the operating-switchboard and the instrument-boards, by which the condition of the various circuits and apparatus is indicated. The relation of these two is indicated in Fig. 7 at 10 11, the former indicating one of the two operating-boards and the latter the instrument-board directly behind it, so that the operator in manipulating the controlling devices has under his eye the indicating instruments, the switches, generators, and other operating devices themselves being disposed in different parts of the building not within immediate reach or inspection of the operator. The high-potential current is not led to the operating-board at all, the only source of current employed at that point being a low-voltage-control current furnished by a suitable generator. I prefer to use the exciter for the field-magnets of the generators as this source, since any damage which kills the field of the generators will necessarily result in opening the switches and preventing injury to the generator-armatures by current flowing from the bus-bars. The leads from such a generator are indicated in the diagram Fig. 3 by the signs plus and minus, which wherever employed will be understood as indicating bus-bars communicating with a convenient source of controlling current.

The generator-operating board is indicated at $10^a$ and contains a group of small switches for each generating unit of the system, as indicated at $12^a$ $12^b$, and in addition three emergency-switches $13^a$ $13^b$ $13^c$, by means of which any one of several distinct parts of the station may be separately shut down, or the entire station may be shut down at the discretion of the operator or independent of his discretion in case of a failure of operating-current in the control system. These emergency-switches, therefore, are either automatic or hand-operated. The generator-operating board contains also an engine-regulating handle for each prime mover (indicated at 14) and a rheostat-controller (indicated at 15) for the automatic rheostat connected to each generator. The generator-instrument board contains an ammeter 16 16ª 16ᵇ for each phase of each generator-lead supplied by a series transformer 17 17ª, &c., interposed in the circuit at a point between the bus-bars and the generator. Adjacent to the generator is a group of series transformers 18 18ª and a potential transformer 19, the secondaries of which connect with a reverse-current relay controlling indicating-lamps 20, mounted at the top of the instrument-board, so as to warn the operator as to a reversal in the direction of energy-flow with respect to any generating unit and permit him to avoid danger from that cause by opening the circuit when necessary. These lamps are fed, as indicated, by the low-tension-control circuit, each lamp-circuit being open at a point 20ª or 20ᵇ, (see Fig. 1,) adapted to be bridged by a contact carried by the armature of the reverse-current relay, two of which are provided to guard against reversal of energy-flow in any phase of the system. These relays consist of two members, one movable and the other stationary, as in case of an electric motor, one winding being supplied by a current-transformer, as 18ª, and the other by a potential-transformer, as 19. The potential-transformers have their primaries severally connected at one terminal with all the phases and at the other with a common point of connection with each other, the secondaries of two being connected with the relay-armatures, respectively, and that of the third closed on an approximately equivalent impedance. Any other arrangement of the potential-coils by which a symmetrical electrical relation to all the phases is effected would of course answer the same purpose. By this means a reversal of energy in any phase of the supply-leads is indicated by one of the two lamps 20 at the instrument-board, according to the particular phase in which the reversal occurs, and the operator may use his judgment as to the propriety of cutting off the generator by observing the ammeter 16 of the corresponding generator.

In addition to the indicating-lamps already described there is provided at the instrument-board a synchronizing lamp 21, which in connection with a synchronizing voltmeter 21ª on the operating-board and a synchronizing plug-socket 21ᵇ permits each generating unit to be synchronized in a manner understood by those acquainted with the art and unnecessary to describe. If desired, a synchronizing device may also be inserted. I provide also at the instrument-board an additional lamp 22 or other signal device connected in circuit with a field-regulating motor-driven rheostat for each generator. This lamp is connected in a manner similar to the arrangement described in the patent issued to me January 15, 1901, No. 665,903, by which the progressive movements of the rheostat in adjusting the field-circuit of the generator are indicated by a lamp, thereby signifying to the operator the condition of the field-magnet circuit, and therefore the condition of the generating-machine. Thus the operator after closing the switch at the operating-board is advised by the twinkling of the lamp 22 that the operating-motor for the rheostat is properly doing its work and the generator-field is being adjusted. In case of the lamp not burning the generator is incapacitated.

The several operating devices of the operating-board are indicated in Fig. 4, the synchronizing voltmeter being indicated at the top at 21ª, the synchronizing plug connected in its socket at 21ᵇ, the rheostat-controlling handle at 21ᶜ, the hand-switches for controlling the generator oil-switches 2 and 3 at 21ᵈ and 21ᵉ, and the engine-controller at 21ᶠ, 21ᵍ representing the field-discharge switch operated at the attendant's pleasure either from the front or rear of the board, and 13ᵇ one of the three emergency-switches already described for automatically throwing the oil-switches in case of no voltage in the control-circuit. A corresponding operating-board is provided for the feeder-circuits, as indicated in the upper part of Fig. 3. The feeder-operating board has the same general arrangement shown in Fig. 4, the operating-switches, however, being both automatic and hand-controlled, as indicated in Fig. 3, and the emergency-switches 23 23ª 23ᵇ (the former being the master-switch for the entire system and the latter for different integral parts of the plant) being all governed by coils in the control-circuit and springs, as indicated at 24 in Fig. 4, to throw them open when the detent controlled by the coils is unlatched. I have deemed it unnecessary to show such a structure in detail, as many forms may be employed. The one here represented is described in full in a copending application of mine, Serial No. 37,242, filed November 21, 1900. On the feeder-control board are also individual automatic switches 25, &c., one for each feeder, and a hand-operated switch 26 for each group-switch and its feeder-switches. An instrument-board 27 containing indicating-instruments shows the condition of the several feeder-circuits. Thus in case of an overload on a particular feeder or any phase thereof the secondary of a series-transformer 28 28ª will actuate a trip-coil 29 29ª and cut out the feeder by permitting the switch to open. Thus the operator at the operating-board knows accurately the condition of the different parts of the system under running conditions, and when operating the switches can follow their movements without actually seeing their action and can shut down any part or all of the station without himself being at any time in dangerous proximity to the high-voltage current. The generator-switches 7 7ª and the bus-bars are located in a separate gallery from the group and feeder switches, each switch itself being well insulated and the circuit-breaking parts housed within fireproof walls, as indicated in Fig. 7, and the several bus-bars are inclosed in separate chambers extending along the gallery, having fireproof walls and floors formed of insulating-slabs. Thus, although the apparatus is concentrated within a comparatively small compass, an injury or short circuit resulting from any cause and interfering with the efficiency of one part of the system is confined to that part, and it is practically impossible to result in a total interruption of service.

In order to provide for repair or change of connections of the switchboards, I render them sectional, as indicated in Fig. 8, as many sections as desired being employed, according to the requirements of the service. As shown, the generators are grouped into four banks, each being connected by switches with a bus-bar, so that it may be connected to the section of the bus-bar to the right or left. Thus if any portion of the generating outfit is disabled the entire system may be connected with the remaining generators while the group needing repair is attended to. Similarly, the bus-bars themselves may be extended or repaired by cutting out any desired part without interfering with the supply of current to any of the feeders. It will be observed that feeders, as 30 31, (see Fig. 8,) leading to a distribution unit—such, for example, as a substation—are taken from more than one section of the bus-bars, thereby insuring a supply of current to the distributing units when any part of the bus-bars are disconnected. I have shown four bus-bar sections 32 32ª 32ᵇ 32ᶜ and connecting-switches 33 33ª 33ᵇ 33ᶜ 33ᵈ for connecting them together and to the several generators.

What I claim as new, and desire to secure by Letters Patent of the United States, is—

1. An electric generating and distributing system comprising a plurality of generator units, power-operated switches between the same and the distributing bus-bars, each separately insulated, an operating-board containing operating devices, an instrument-board grouped at a common point distant from the switches, and means for controlling the power to operate the switches at said operating-board.

2. An electric generating and distributing system for high-potential currents, comprising a plurality of generator units, switches between the same and the distributing bus-bars, each separately insulated on an independent foundation, and control devices leading from the same to a common operating-point containing indicating and circuit-controlling devices.

3. An electric generating and distributing system for high-potential currents, comprising independent generator units, switches between the same and the distributing bus-bars, each switch having an independent foundation and having its circuit-breaking parts housed within fireproof walls, control devices for the several switches, an operating-board for all the switches, and indicating devices showing the condition of the several generating and distributing parts.

4. An electric generating and distributing system for high-potential currents, comprising independent generator units, switches between the same and the distributing bus-bars, a distant operating-board to control the several switches, a connecting control-circuit, and means for opening any switch when current fails in its control-circuit.

5. An electric generating and distributing system for high-potential currents, comprising a plurality of generator and feeder circuits, high-potential switches included therein, a bench-board, control-switches for operating the high-potential switches arranged on said bench-board in a definite order to indicate by their positions the relation of the several generator and feeder circuits, and low-potential-control circuits between said control and high-potential switches.

6. An electric generating and distributing system for high-potential currents, comprising a generator unit, distributing bus-bars, a plurality of switches in series between the generator and the bus-bars, and means for independently manipulating the switches from a distant point of control.

7. An electric generating and distributing system for polyphase currents, comprising a generator, a distributing-circuit, and a reverse-current indicator governed by a reversal of energy-flow, said indicator being governed by potential coils in symmetrical relation to all the phases, and series coils derived from the system.

8. An electric generating and distributing system, comprising a plurality of generator units, a plurality of feeders, sectional bus-bars, and switches for cutting out a desired section of the bus-bars and shifting the load upon the remaining section.

9. An electric generating and distributing system, comprising generators, switches between the same and the bus-bars, a plurality of feeders each having an independent switch, a group-switch controlling a plurality of feeders interposed between the bus-bars and the feeder-switches, and an operating-board for controlling the several switches.

10. An electric generating and distributing system comprising a plurality of generator units, switches between the same and distributing bus-bars, a plurality of independent feeder-switches, a group-switch between the bus-bars and a plurality of feeder-switches, overload devices for opening the feeder-switches, and hand-operated devices at a control-board distant from the switches for manipulating all of said switches.

11. An electric generating and distributing system comprising a generating outfit, a plurality of feeders and feeder-switches, overload devices for said switches, and hand-operated switches for operating the several switches individually, in groups or collectively.

12. An electric generating and distributing system comprising a generator, switch apparatus between the same and the distribution system, control apparatus therefor at a distant operating-board, and instruments adjacent to the control apparatus for indicating when the controlled apparatus has operated.

13. An electric generating and distributing system, comprising a generating outfit, a sectional bus-bar, and a plurality of feeders derived from different sections of the bus-bars leading to a common distribution unit.

14. An electric generating and distributing system comprising a generating outfit, a sectional bus-bar, and a plurality of distribution units, each supplied by a plurality of feeders leading from different sections of the bus-bars.

15. An electric generating and distributing system, comprising a generating outfit, a switch connecting the same with a distribution-circuit, a source of excitation for the generator, and a circuit leading from said source governing the switch.

16. An electric generating and distributing system, comprising a plurality of generators, distributing bus-bars, switches between the generators and the bus-bars, an exciter for the generator-fields, and connections with the exciter-circuit for opening the switches when the exciting energy declines to a determinate point.

17. In an electric generating and distributing system, the combination of a plurality of controlled switches, a plurality of conductors adapted to be variously connected by said switches, an operating-board having thereon devices representing said switches and adapted to occupy different positions corresponding to positions of the switches, and controlling connections between said switches and devices whereby the throwing of the devices to their different operative positions will cause their respective switches to move to corresponding positions, said devices being arranged on said board so as to indicate by their positions the circuits through said conductors.

18. In an electric generating and distributing system, the combination of a system of conductors, a plurality of controlled switches located at convenient points and adapted to connect said conductors in various circuits, a plurality of control devices therefor adapted to occupy different positions corresponding to the positions of said switches, and an operating-board upon which said devices are mounted in definite lines whereby the condition of said switches and the circuits through said conductors may be readily determined by observing the relative positions of said devices.

19. In an electric generating and distributing system, the combination of a system of conductors, two sets of controlled switches located at convenient points, the switches for each set being similarly connected in the system of conductors, two sets of controlling devices therefor, each device being adapted to occupy a different position corresponding to the position of its switch, and an operating-board upon which said devices are mounted in definite lines whereby the condition of the switches of either set and the circuits through said conductors may be readily determined by observing the relative positions of said switches.

20. In an electric generating and distributing system, the combination with a plurality of generating sets each comprising a prime mover, a generator, and switches between the same and the distributing bus-bars, of an operating-board therefor comprising a plurality of devices for controlling the different elements of each generating set, said devices being arranged so that the devices corresponding to the like elements of the different generating sets lie in definite lines and the devices corresponding to the elements of each generating set lie in a line at an angle thereto.

In witness whereof I have hereunto set my hand this 3d day of October, 1901.

EDWARD M. HEWLETT.

Witnesses:
G. C. HOLLISTER,
HELEN ORFORD.